July 16, 1940.        R. C. BERKER        2,208,318
GILL SCREW
Filed April 7, 1939
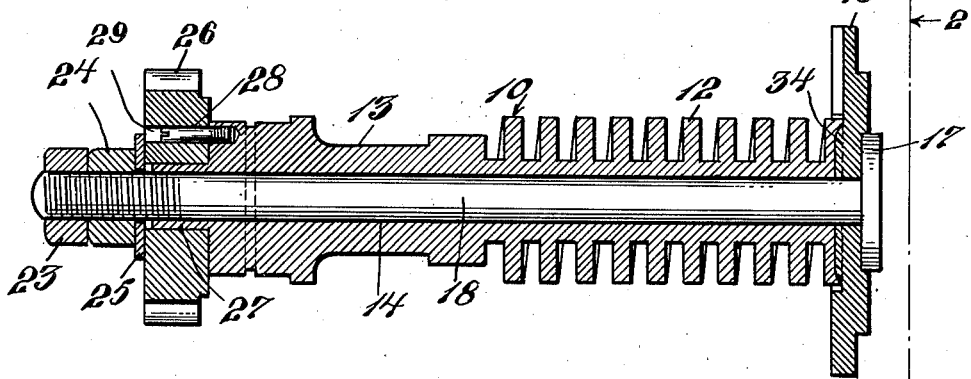
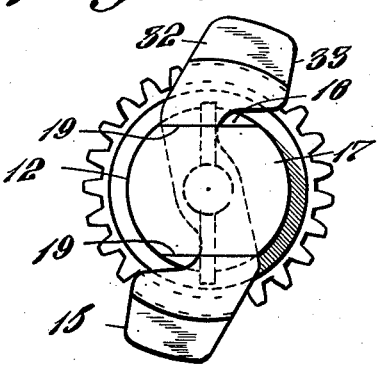
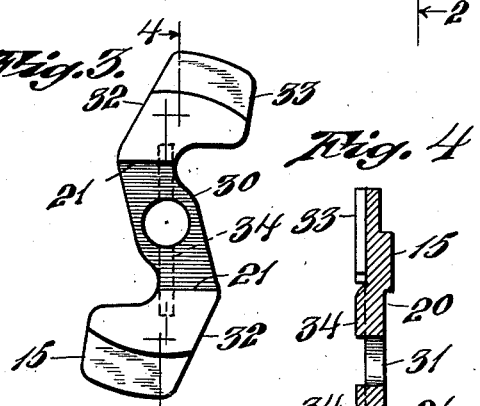
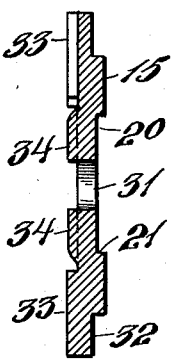
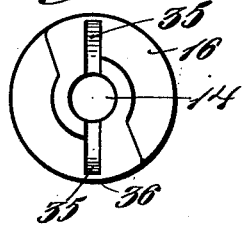
INVENTOR.
Ralph C. Berker
BY Barlow & Barlow
ATTORNEYS.

Patented July 16, 1940

2,208,318

UNITED STATES PATENT OFFICE 2,208,318

GILL SCREW

Ralph C. Berker, Hoxie, R. I.

Application April 7, 1939, Serial No. 266,610

10 Claims. (Cl. 19—129)

This invention relates to gill screws for gill-drawing frames; and has for one of its objects to provide a strong and efficient coupling means between the end of the screw portion of the gill screw and the faller cam for rotatively driving the same and without producing a weakened condition of the end thread of the screw whereby breaking or damage thereof would result when the coupling means is subjected to the normal strains imposed thereon during operation of the screw.

Another object of the invention is the driving of the faller cam from opposite side faces of the same.

Another object of the invention is the driving of the faller cam by the screw portion of the gill screw and the attaching means for securing the faller cam to the gill screw.

With these and other objects in view, the invention consists of certain novel features of construction, as will be more fully described, and particularly pointed out in the appended claims.

In the accompanying drawing:

Fig. 1 is a central longitudinal sectional view of the top-screw of a gill-drawing frame showing the faller cam at one end of the screw and my improved coupling means for locking the cam rotatively with the screw;

Fig. 2 is an end view of the gill screw shown in Fig. 1, taken on line 2—2 thereof, and viewed in the direction of the arrows;

Fig. 3 is an end view of the faller cam represented in Fig. 2 showing in dotted lines the integral coupling keys on the arms of the cam;

Fig. 4 is a transverse sectional view taken on the line 4—4 of Fig. 3; and

Fig. 5 is an end view of the threaded portion of the gill screw showing the cross slots or splines of my improved coupling for receiving the keys on the faller cam.

In one prior form of top screw for gill-drawing frames, the construction has involved a hollow screw member having its faller cam carried on an axial bolt extending through an axial bore in the screw and projecting from the end of the screw, with a collar and nuts screwed onto the bolt to hold the cam in place. Keys on the arms of the faller cam engage radial splines or slots cut into the end thread of the threaded portion of the top-screw to lock the cam rotatively with the screw. In this prior type of construction, the splines or slots in the end thread of the screw extend radially inwardly from the outer circumferential surface of the thread and completely across the end or face of such thread thereby weakening the stock of the end thread to a detrimental extent so that early cracking or rupture of the end thread at the spline thereof often occurs under the strains imposed thereon by the keys during normal use of the screw, thereby necessitating the removal of the whole screw for replacement or repair by welding of the end thread; and in order to overcome this difficulty and to provide a stronger and more durable attaching means for coupling the faller cam to the gill screw, I have formed the end of the screw with radial cross-slots or splines which extend only partially across the end or face of the end thread thereof in which the outer end of the spline or slot terminates at a point short of the outer cylindrical surface of the end thread but well spaced below the same so as to not interrupt the continuity of surface of such cylindrical portion of said thread whereby the part of the thread at the circumference of the thread will be one integral piece and strengthened, and the slots will be effectively concealed from view. As a further feature of the invention, I further utilize the head of the bolt extending through the axial bore in the screw in addition to the keys on the arms of the cam, for rotatively driving the faller cam, in which instance, I have provided a pair of flat side faces on the edge of the thin enlarged partially disk-like head of the clamping bolt for abutting engagement with the flat side walls of a recess in the cam within which the head of the bolt is received in the assembled gill screw, and the following is a more detailed description of the present embodiment of this invention, illustrating the preferred means by which these advantageous results may be accomplished:

With reference to the drawing, 10 generally designates the screw member of the gill screw and is of a usual type of construction having a threaded portion 12 and a shaft portion 13 integral therewith with an axial bore 14 extending throughout the length of the screw member 10. A removable faller cam 15 for raising the fallers or gill bars from the bottom screw into the top screw, not shown, is clampingly held between the end face 16 of the threaded portion 12 of the screw and the enlarged head 17 of a bolt 18 which extends through the bore 14 in the screw and projects beyond the inner end thereof. As shown in Fig. 2, the head 17 of this bolt is of partially circular formation and provided with a pair of diametrically opposed flat side portions 19 adapted to enter into a partially circular recess 20 milled in the outer side face of the cam 15 to engage the side walls 21 of the same to hold the cam in place when the nuts 23 and 24, which are threadingly mounted on the threaded projecting end of the bolt, are tightened and set up against a washer 25 to force it into tight abutting contact with the outer side face of the usual drive gear 26 for rotating the screw. The gear 26 is shown as being carried on a reduced sleeve portion 27 of the screw with its hub in abutting contact with the end of the shaft portion 13. A pin 28 threaded into this end of the shaft portion 13 is received by one of several holes 29 in the gear when the parts are clamped together, the holes extending parallel to its axis and in predetermined angular relation to each other to facilitate the angular setting or timing of the gear 26 relative to the screw and also providing a positive drive for rotating the gill screw. The removable faller cam 15 may be of a generally S-shaped form as represented in Fig. 3, or it may be other conventional form, and is provided with a hub 30 having an axial bore 31 with radial arms 32 extending outwardly therefrom and terminating in the cam faces 33. Formed integral with the inner side face of the faller cam that abuts the end face of the end thread of the top screw are the relatively narrow radial keys 34 which are received in the radial cross-slots or splines 35 cut into the end face of the end thread of the threaded portion 12 of the screw member 10 thereby providing a positive and rigid driving connection of the cam with the screw and to lock the cam rotatively with the screw. As illustrated in Fig. 5, the cross slots or splines 35 are disposed at right angles to the central axial bore of the screw and extend radially outwardly therefrom to terminate at a point close to but below the exterior cylindrical surface 36 of the end thread of the screw.

In assembling the gill screw, the faller cam 15 is placed with its keys 34 inserted into the cross-slots or splines 35, after which the clamping bolt 18 is then inserted through the bore 31 of the cam and the axial bore 14 of the screw. It will thus be seen that when the nuts 23 and 24 are set up tight, the bolt 18 will be drawn longitudinally through the axial bore 14 of the screw and the head 17 of the bolt will be caused to be seated within the recess 20 and to abut into firm engagement with the outer face of the faller cam 15 thereby clamping the inner face of the cam against the end face of the end thread of the screw to hold the keys 34 securely in place in the slots or splines 35.

It will also be noted that with my improved coupling construction, the circumferential portion of the cross section of the end thread of the screw is not cut away or weakened, as in the common practice with one conventional construction of gill screw, but with the present improvement a small section of the screw at the peripheral surface of the end thread is left uncut to provide a stiffening and strengthening element to reinforce it against the severe strains and stresses to which the screw is subjected during its normal use. The end thread of the screw is therefore much stronger and is less liable to be ruptured or cracked in use in the gill-drawing frame.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:
1. A gill screw for gill-drawing frames comprising a screw member having an axial bore extending throughout its length, a cam at one end of the screw member, a bolt having a head at one end interlockingly engaging and connecting the cam rotatively with the bolt, said bolt extending through the bore in the screw member with a portion projecting beyond the opposite end of the screw from that at which the cam is located, means connecting the cam rotatively with the screw, and means at the projecting end of the bolt for securing the cam in place on the screw.

2. A gill screw for gill-drawing frames comprising a screw member having an axial bore extending throughout its length, a cam abutting the end thread of the screw member, a bolt having a head at one end interlockingly engaging and connecting the cam rotatively with the bolt, said bolt extending through the bore in the screw member with a portion projecting beyond the opposite end of the screw from that at which the cam is located, means connecting the cam rotatively with the screw, consisting of a key on the inner face of said cam engaging a slot in the outer end of the end thread of the screw, said slot extending radially outwardly from the bore with the outer end of the slot terminating near to but below the exterior cylindrical surface of the end thread, and means at the projecting end of the bolt for securing the cam in place on the screw.

3. A gill screw for gill-drawing frames comprising a screw member having an axial bore extending throughout its length, a cam abutting the end thread of the screw member, a bolt having a head at one end interlockingly engaging and connecting the cam rotatively with the bolt, said bolt extending through the bore in the screw member with a portion projecting beyond the opposite end of the screw from that at which the cam is located, means connecting the cam rotatively with the screw consisting of a plurality of radial keys on the inner face of said cam engaging slots in the outer end of the end thread of the screw, each of said slots extending radially outwardly from the bore with the outer end of each slot terminating close to but spaced below the exterior cylindrical surface of the end thread to provide a stiffening and strengthening portion at such places, and means carried by the projecting end of the bolt for securing the cam in place on the screw.

4. A gill screw for gill-drawing frames comprising a screw member having an axial bore extending throughout its length, a faller cam abutting the end thread of the screw member, a bolt having a head at one end interlockingly engaging and connecting the cam rotatively with the bolt, said bolt extending through the bore in the screw member with a threaded portion projecting beyond the opposite end of the screw from that at which the cam is located, means connecting the cam rotatively with the screw consisting of a pair of diametrically opposed thin radially extending keys on the inner face of said cam engaging a pair of diametrically opposed slots in the outer end of the end thread of the screw, each of said slots extending radially outwardly from the bore of the screw with the outer end of each slot terminating close to but below the exterior cylindrical surface of the end thread, to provide a stiffening and strengthening element at such places and integral with the screw, and a nut carried by the threaded projecting end of the bolt for securing the faller cam in place on the screw.

5. A gill screw for gill-drawing frames comprising a screw member formed with a cross-slot partially extending across the outer end face of its end thread in which the outer end of the cross-slot terminates close to but below the exterior cylindrical surface of the end thread of the screw to provide a stiffening and strengthening element at such position integral with the screw, a faller cam fastened to the end of the screw and provided with a key on its inner face engaging the cross-slot of the screw to secure the cam for rotation with the screw and in certain definite angular relation with respect to the threads thereof, and means to hold the cam into engagement with the screw and having interlocking engagement with said cam.

6. A gill screw for gill-drawing frames comprising a screw member formed with a pair of diametrically opposed radial slots partially extending across the outer end face of its end thread in which the outer end of the cross slot terminates short of but below the exterior cylindrical surface of the end thread of the screw to provide stiffening and strengthening elements at such positions integral with the screw, a faller cam fastened to the end of the screw and provided with a pair of diametrically opposed radial keys on its inner face engaging the cross slot of the screw to secure the cam for rotation with the screw and in certain angular definite relation with respect to the threads thereof, and means to hold the cam into engagement with the screw and having interlocking engagement with said cam.

7. The combination with a gill screw having an axial bore extending throughout its length, of a cam abutting the end thread of the screw and having a partially circular recess in its outer face with opposed flat side walls, a threaded bolt extending through the cam and the bore in the screw and provided with a partially circular thin enlarged head received within the recess in the face of the cam, said head having a pair of diametrically opposed flat parallel sides for engaging the flat side walls of the recess to connect the cam rotatively with the bolt, and means carried by the bolt to draw it through the bore to tighten and clamp the head of the bolt against the cam to secure the latter in place on the screw.

8. The combination with a gill screw having an axial bore extending throughout its length, of a cam abutting the end thread of the screw and having a partially circular recess in its outer face with opposed flat side walls, a threaded bolt extending through the cam and the bore in the screw and provided with a partially circular thin enlarged head received within the recess in the face of the cam, said head having a pair of diametrically opposed flat parallel sides for engaging the flat side walls of the recess to connect the cam rotatively with the bolt, means connecting the cam rotatively with the screw consisting of a pair of diametrically opposed radially extending keys on the inner face of said cam engaging a pair of diametrically opposed slots in the outer end of the end thread of the screw, each of said slots extending radially outwardly from the bore of the screw with the outer end of each slot terminating near to but below the exterior cylindrical surface of the end thread, and means carried by the bolt to draw it through the bore to tighten and clamp the head of the bolt against the cam to secure the latter in place on the screw.

9. A gill screw comprising a screw member having peripheral threads of partially cylindrical formation and a transverse slot extending partially across one end formed in the outer end face of an end convolution of the screw, said slot terminating at its outer end within a short distance of the exterior peripheral surface of said end convolution of the screw, said end convolution being continuous across its exterior cylindrical peripheral face and all one piece without slot cut-outs.

10. A gill screw comprising a screw member having peripheral threads of partially cylindrical formation and an axial bore extending throughout its length with substantially radial slots at one end of the screw formed in the outer end face of an end convolution of the screw, said slots extending outwardly from said bore and terminating within a short distance of the exterior peripheral surface of said end convolution, of the screw, said end convolution being continuous across its exterior cylindrical peripheral face and all one piece without slot cut-outs.

RALPH C. BERKER.